Oct. 4, 1927.                    1,644,210
P. UPHAM
OIL CUP
Filed Feb. 1, 1923

Inventor:
Preston Upham
by Emery, Booth, Janney & Varney.
Attys

Patented Oct. 4, 1927.

1,644,210

UNITED STATES PATENT OFFICE.

PRESTON UPHAM, OF BROOKLINE, MASSACHUSETTS, ASSIGNOR, BY MESNE ASSIGNMENTS, TO THE BASSICK MANUFACTURING COMPANY, OF CHICAGO, ILLINOIS, A CORPORATION OF DELAWARE.

OIL CUP.

Application filed February 1, 1923. Serial No. 616,278.

This invention pertains to improvements in oil cups. It is among the objects of the invention to provide a cup through which lubricant may be flushed under pressure from an oil gun and which, when said pressure is removed, will more slowly feed lubricant to the part to be lubricated.

In the drawings, which show a preferred form of one embodiment of my invention:

Figure 1:
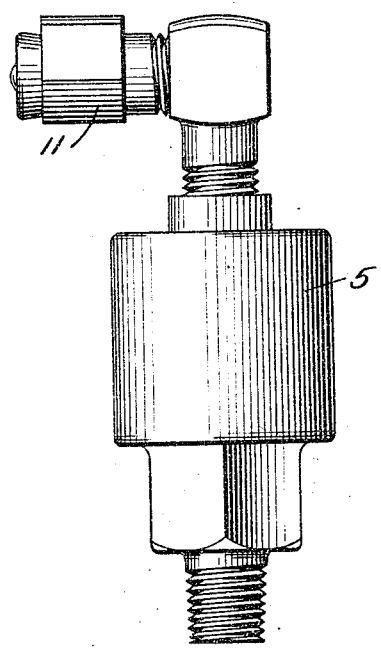
Figure 1 is a side elevation of a lubricant cup provided with a quick detachable connection.
Figure 2:
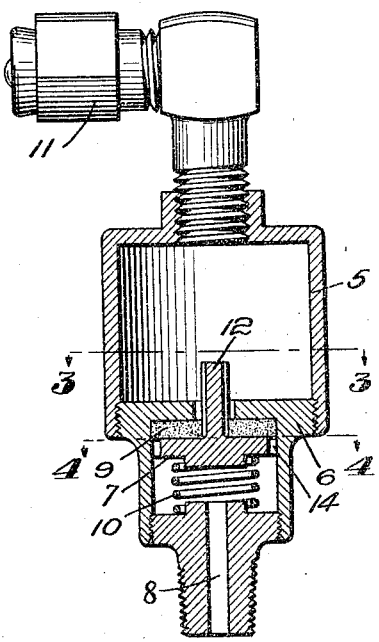
Fig. 2 is a view similar to Fig. 1, showing the cup in section.

Referring to the drawings and to the preferred form of my invention selected for illustrative purposes, I have shown a cup including a body 5 engaging a bottom portion 6 provided with a valve 7 interposed in the path of the lubricant to the passage 8 communicating with the part to be lubricated. Above the metal portion of the valve 7, I have provided a porous washer 9 which may be of felt to permit seepage of the lubricant therethrough when the valve is closed. A spring 10 presses the valve 7 toward its seat. At the upper end of the body 5, I have shown a quick detachable cup-filling connection 11, which is of the type adapted to co-operate with a quick detachable lubricant gun, such for instance as that shown in the co-pending application of Howard J. Murphy, Serial No. 543,656, filed March 14, 1922.

When the lubricant gun is connected to the nipple 11, the lubricant is forced through the connection into the body 5 of the cup, the pressure against the upper portion of the valve 7 will cause said valve to move downwardly with the felt washer 9, providing a direct opening through the cup to the passage 8 and to the part to be lubricated. When the pressure on the lubricant supplied through the nipple 11 is removed, the valve 7 will close, leaving the cup 5 filled with the lubricant, which will then seep slowly through the felt 9 and thence be slowly fed by gravity through the port 8 to the part to be lubricated.

Figure 3:
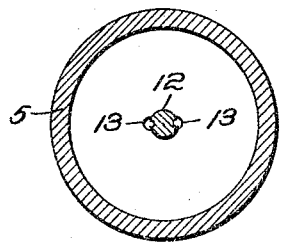
Fig. 3 is a section on the line 3—3 of Fig. 2, being partly in elevation.
Figure 4:
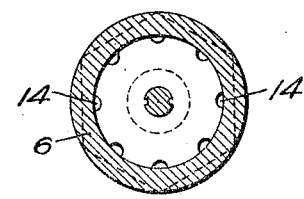
Fig. 4 is a section on the line 4—4 of Fig. 2, being partly in elevation.

The valve 7 may be formed to fit the interior of a cylindrical recess in the lower portion 6 of the cup, and also be guided by an upwardly extending stem 12 movable in guided relation to the head 6, as best shown in Fig. 3. Where this guided construction is used, the initial passage of the lubricant may be through the ports 13 and recesses 14 in the periphery of the valve proper 7.

While I have shown and described a preferred embodiment of my invention, it will be understood that I have done so for purposes of clarification and not for purposes of limitation. My invention is best defined in the following claims.

I claim:

1. A lubricant cup including a reservoir, a quick detachable connection secured to said reservoir for engagement by a lubricant gun, lubricant pressure-operated valve means normally permitting only a restricted flow of lubricant from said reservoir to a part to be lubricated, but adapted to be reciprocated to permit flow of lubricant under greatly increased pressure from said reservoir to the part to be lubricated.

2. A lubricant cup including a quick detachable connection for engagement with a supply of lubricant under pressure, a reservoir adapted to be filled through said connection, an aperture in the bottom of said reservoir, a reciprocable part guided in and below said bottom, a lubricant-permeable washer carried by said reciprocable part and normally seated against the bottom of said reservoir as a seat and a spring normally urging said washer and reciprocable part toward the seat to restrict the flow of lubricant from said reservoir, said washer and reciprocable part adapted to be reciprocated by increased pressure of the lubricant in said reservoir to permit flow of lubricant under relatively high pressure from said reservoir to a part to be lubricated.

3. A lubricant cup presenting a reservoir for reception of lubricant under pressure, a discharge aperture at the bottom of said reservoir, and a spring-pressed valve normally closing said aperture, said valve operable by the pressure of the lubricant supplied to said reservoir to open said valve thereby permitting free passage of lubricant from said reservoir while the lubricant is being supplied thereto, said valve thereafter closed by said spring to permit only slow gravity-actuated feed of lubricant from said reservoir, said valve including an oil-permeable flexible washer back-supported by a rigid guided part having notches below the outer peripheral portion of said flexible washer.

In testimony whereof, I have signed my name to this specification.

PRESTON UPHAM.